Jan. 22, 1963  F. HINDEN  3,074,336
DIAPHRAGM DEVICES FOR PHOTOGRAPHIC OR
CINEMATOGRAPHIC CAMERAS
Filed Sept. 28, 1959  2 Sheets-Sheet 2
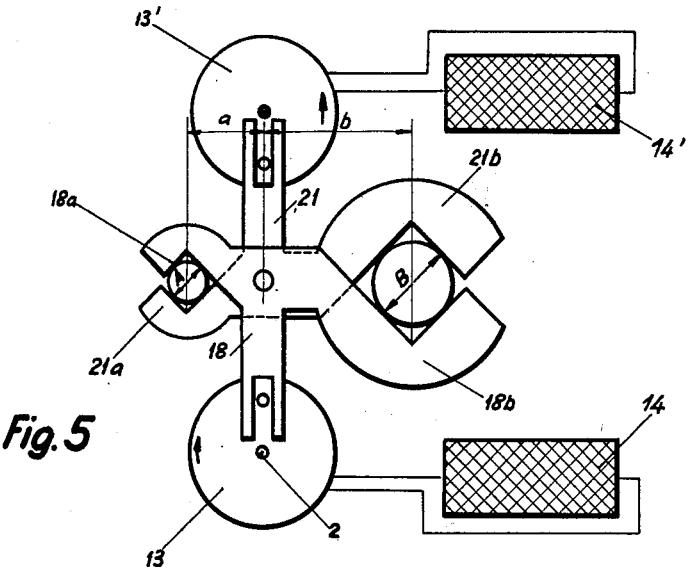
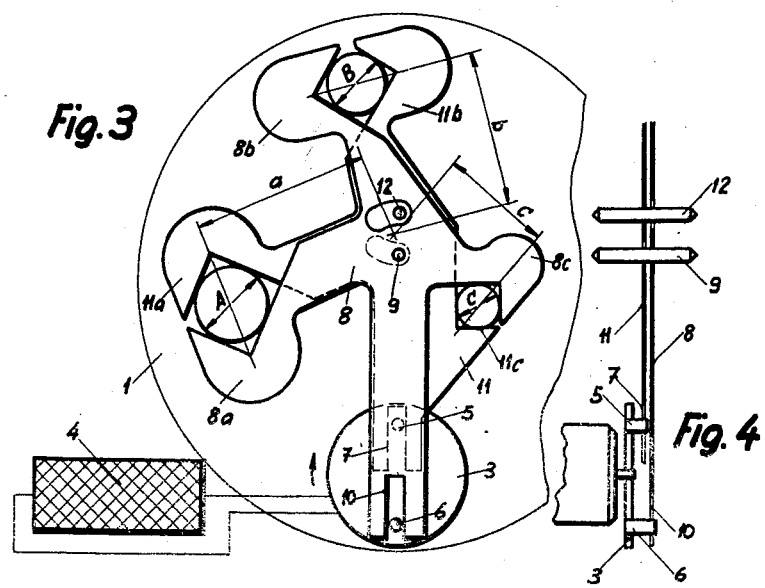
INVENTOR
FRITZ HINDEN
ATTORNEY United States Patent Office 3,074,336
Patented Jan. 22, 1963

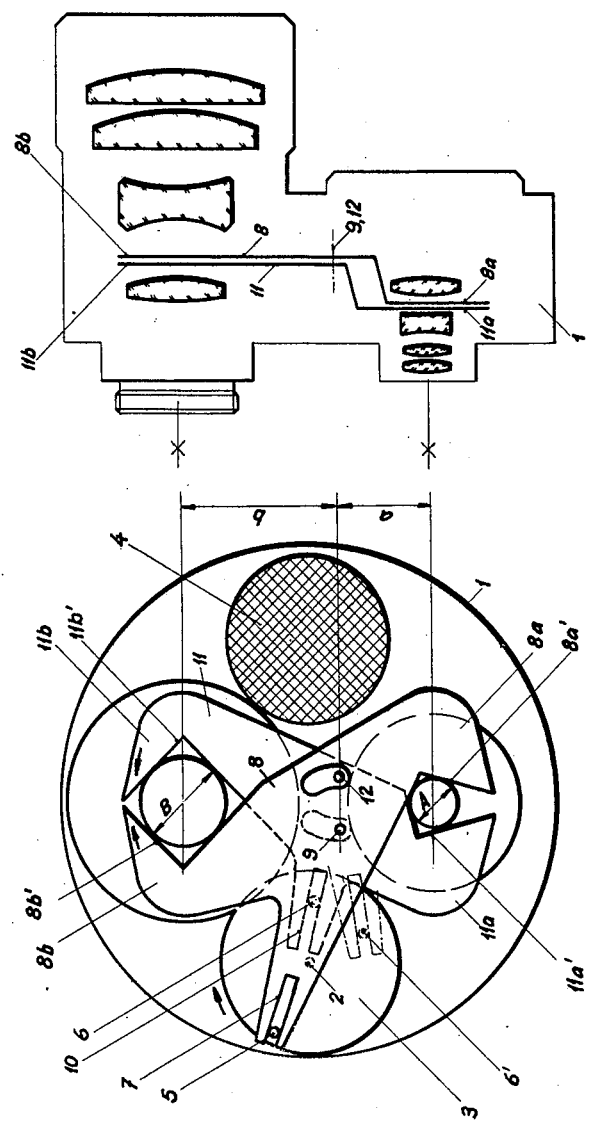

3,074,336
DIAPHRAGM DEVICES FOR PHOTOGRAPHIC OR CINEMATOGRAPHIC CAMERAS
Fritz Hinden, Landhausweg 53, Aarau, Switzerland
Filed Sept. 28, 1959, Ser. No. 842,970
Claims priority, application Switzerland Sept. 29, 1958
7 Claims. (Cl. 95—64)

The invention relates to photographic and cinematographic cameras such as cameras in which a built-in diaphragm is automatically controlled according to the amount of light required for the exposure, are known. These photographic and cinematographic cameras have the disadvantage that only a lens which is fixed in the camera can be used.

Photographic and cinematographic cameras in which a master lens with automatic diaphragm is fixed in the camera, and two or more lenses of a set are mounted on a rotatable lens turret have previously been provided to avoid this disadvantage. Lenses of a set of the same optical quality as lenses which can be calculated irrespective of the master lens provided, can only be made at substantial expense. Moreover, in these photographic and cinematographic cameras some special lenses such, for example, as telephoto lenses of great focal length cannot be used. These disadvantages are avoided by the invention.

The invention relates to a diaphragm device controlled by at least one photoelectrically controlled moving coil instrument for photographic or cinematographic cameras, in which at least two lenses are mounted on a lens turret, the diaphragm device being provided with two contra-rotating laminae which are each provided with a light-limiting diaphragm part for each lens, all in such manner that the adjustment of the diaphragm formed by a light-limiting diaphragm part of each of the two laminae is varied in dependence upon the photoelectric control of the moving coil instrument simultaneously and in the same direction for all of the lenses provided.

Since in this diaphragm device the diaphragms of all of the lenses provided are simultaneously and automatically adjusted according to the illumination or lighting prevailing, it is unnecessary to correct adjustment of the diaphragm when a lens is changed.

The moving coil instrument by which the control of the diaphragm device is effected, may be operated by a specific photoelectric cell, such, for example, as a selenium cell which supplies its own current, or which may be controlled by a current source combined with a photo-resistance which, in the non-exposed position stops the passage of current, whilst, in the exposed position, allows current to pass.

Three constructions of the subject-matter of the invention are diagrammatically illustrated by way of example in the accompanying drawings, in which:

FIGURE 1 is a front elevation of a diaphragm device for photographic or cinematographic cameras, in which two lenses are mounted on a lens turret, the device being controlled by a moving coil instrument controlled by a photo-electric cell;

FIGURE 2 is an axial section through the diaphragm device illustrated in FIGURE 1;

FIGURE 3 is a front elevation of a diaphragm device for photographic or cinematographic cameras, in which three lenses are mounted on a lens turret, the device being controlled by a moving coil instrument controlled by a photo-electric cell;

FIGURE 4 is a part-sectional elevation of the diaphragm device illustrated in FIGURE 3; and FIGURE 5 is a front elevation of a diaphragm device for photographic or cinematographic cameras, in which two lenses are mounted on a lens turret, the device being controlled by two moving coil instruments which are each controlled by their respective photo-electric cells.

In FIGURES 1 and 2, the lens turret in which two lenses and the diaphragm device are mounted, is denoted by 1. The diaphragm device is controlled by a moving coil instrument, of which only a disc-like part 3 rotatable about the axis 2 is shown in FIGURE 1, the moving coil instrument being controlled by a photo-electric cell 4. On the disc 3 of the moving coil instrument are mounted two substantially diametrically opposed pins 5 and 6 which extend parallel to the shaft of the disc 3. The pin 5 is disposed in a guide slot 7 of a lamina 8 which a mounted on a shaft 9 suspended in position, the pin 6 being mounted in a guide slot 10 of a lamina 11 which is mounted on the shaft 12 suspended at a position close to the shaft 9. For each of the two lenses, the maximum openings of which are respectively denoted by A and B in FIGURE 1, the two laminae 8 and 11 are each provided with light-limiting diaphragm parts 8a, 8b and 11a, 11b respectively which are each provided with V-shaped apertures 8a', 8b' and 11a', 11b' respectively. The apertures 8a' and 11a' and 8b' and 11b' respectively together form the diaphragm apertures for the two lenses.

In the diaphragm device illustrated in FIGURE 1, the diaphragms are shown opened to the maximum possible extent. The moving coil instrument is controlled according to the degree to which the photo-electric cell 4 is exposed to light, the disc-like part 3 with the two pins 5 and 6 rotating more or less in the clockwise direction. Thereby the lamina 8 is rotated in the clockwise direction by the pin 5 guided in its guide slot 7, whilst the lamina 11 is rotated in the opposite direction by the pin 6 which is guided in its guide slot 10. Since the laminae 8 and 11 rotate in opposite directions, the diaphragm apertures of the two lenses formed by the V-shaped apertures 8a', 11a' and 8b', 11b' respectively are simultaneously reduced in size in the manner of tongs. Since the direction of the guide slots 7 and 10 with respect to the direction of the connecting line between the axis of rotation 2 of the disc 3 and the pins 5 and 6 respectively is varied by the rotation of the laminae 8 and 11, the rotational path of the laminae 8 and 11 with respect to the rotation of the disc 3 is correspondingly varied. The closing movement initially accelerated to a maximum approaches the dead centre point when the pin 6 is in the position 6' indicated in dotted lines. It is thus rendered possible for the paths of movement of the laminae 8 and 11 to be adapted to the non-uniform characteristic of movement of the moving coil instrument. An even better adaptation or adjustment to the path of movement of the laminae 8 and 11 to the characteristic of movement of the moving coil instrument can be achieved by substituting for the straight guide slots 7 and 10, shown in the drawings, such guide slots as follow a curve to allow for the characteristic of movement of the moving coil instrument. An additional adaptation to the closing movement of the diaphragms may also be achieved by adjusting the form of the V-shaped apertures 8a', 8b', 11a' and 11b', it being, where desired, also possible for the two light-limiting edges not to be straight. The distances A and B, that is to say, the distances of the two lens axes from the axes of rotation 9 and 12 of the laminae 8 and 11 are advantageously provided at the ratio $A:B$ in order to allow for the different diaphragm diameters.

It will be noted from FIGURE 2 that the light-limiting diaphragm parts 8a and 11a of the laminae 8 and 11 are bent substantially at right angles in order to ensure that the diaphragm formed by the light-limiting diaphragm parts 8a, 11a and 8b, 11b come to lie in that diaphragm plane which is most advantageous for both lenses.

The diaphragm device illustrated in FIGURES 3 and 4 is distinguished from the diaphragm device hereinbefore described merely by being provided for photographic or cinematographic cameras, in which the lens turret carries three lenses, and the reference numbers used in FIGURES 3 and 4, therefore, correspond to those used in FIGURES 1 and 2. In this construction, however, the two laminae 8 and 11 are respectively provided with three light-limiting parts 8a, 8b, 8c and 11a, 11b, 11c to correspond to the three lenses provided.

It will be understood that it would also be possible for the two laminae 8 and 11 to be coaxially mounted on a single shaft so as to be rotatable in opposite directions. Since, however, the driving power generated by photo-electrically controlled moving coil instruments is very low, it will be found to be more advantageous to mount the laminae 8 and 11 in the manner hereinbefore described. It will be understood that the openings respectively for the shafts 12 and 9 in the laminae 8 and 11 should be sufficiently large to ensure that the rotation of the laminae 8 and 11 is not hindered.

In the diaphragm device illustrated in FIGURE 5, two moving coil instruments 13, 13' which are respectively controlled by the photo-electric cells 14, 14' are provided to secure sufficient driving power. In this construction, the moving coil instrument 13 operates a lamina 18, while the moving coil instrument 13' operates a lamina 21. The remaining structure and operation of this diaphragm device correspond exactly to those of the constructions hereinbefore described.

I claim:

1. A device for setting an adjustable diaphragm of portable still and motion picture film cameras, said device comprising a lens turret mounting several objective lenses, a moving coil device including a rotary member, a photoelectric cell connected in circuit with said moving coil device to rotate the rotary member thereof by power generated by the cell, the amount of light incident upon said cell controlling the position of said rotary member, and a pair of rotatably mounted diaphragm setting blades, each of said blades including a diaphragm opening control portion for each objective lens and being in direct driving engagement with said rotary member for rotation in unison therewith to control the positions of said control portions of the blades in reference to each other, said blades being rotated by said rotary member in opposite direction in reference to each other in response to rotation of said member in one direction, each relative position of the control portions of said blades effecting simultaneously a corresponding diaphragm opening at all the objective lenses.

2. A diaphragm device according to claim 1 wherein said blades have plane parts located in several parallel planes, each of said plane parts including one of said control portions and each of the planes comprising the said parts being correlated with the optical characteristic of the respective objective lens.

3. A diaphragm device according to claim 1 in which the control portions of the two blades are each provided with a V-shaped aperture, each aperture of each of the two control portions defining together a diaphragm opening varied by the relative position of said portions.

4. A diaphragm device according to claim 1 in which the control portions of the two blades are each provided with a V-shaped aperture, each aperture of each of the two control portions defining together a diaphragm aperture varied by the relative position of said portions, the configuration of said V-shaped apertures of the control portions being correlated with the characteristic of movement of the movable member of the moving coil device so that a slight turning of the blades is sufficient to close the diaphragm openings.

5. A diaphragm device according to claim 1 in which the distance of the axes of the lenses from the axes of rotation of the blades is at least proportional to the diaphragm diameters.

6. A diaphragm device according to claim 1 in which each of the blades is provided with a guide slot, and comprising a pin for each blade mounted on the rotary member of the moving coil device and extending parallel to the shaft of the said rotating part, each pin engaging one of said slots to rotate the respective blade.

7. A diaphragm device according to claim 1 in which each of the blades is provided with a guide slot, and comprising a pin for each blade mounted on the rotary member of the moving coil device and extending parallel to the shaft of said rotating part, each pin engaging one of said slots to rotate the respective blade, the guide slots of the two blades defining a curve conforming to the characteristic of movement of the rotary member of the moving coil device.

References Cited in the file of this patent

UNITED STATES PATENTS

| | | |
|---|---|---|
| 2,163,737 | Prinsen | June 27, 1939 |
| 2,421,499 | Guedon | June 3, 1947 |
| 2,885,937 | Donnay | May 12, 1959 |

FOREIGN PATENTS

| | | |
|---|---|---|
| 216,966 | Switzerland | Jan. 16, 1942 |